Oct. 8, 1957 K. L. STORRS 2,809,154
HEAT TREATMENT OF SUBSTANCES FOR THE RECOVERY
OF DECOMPOSITION PRODUCTS
Filed Oct. 15, 1948 9 Sheets-Sheet 7
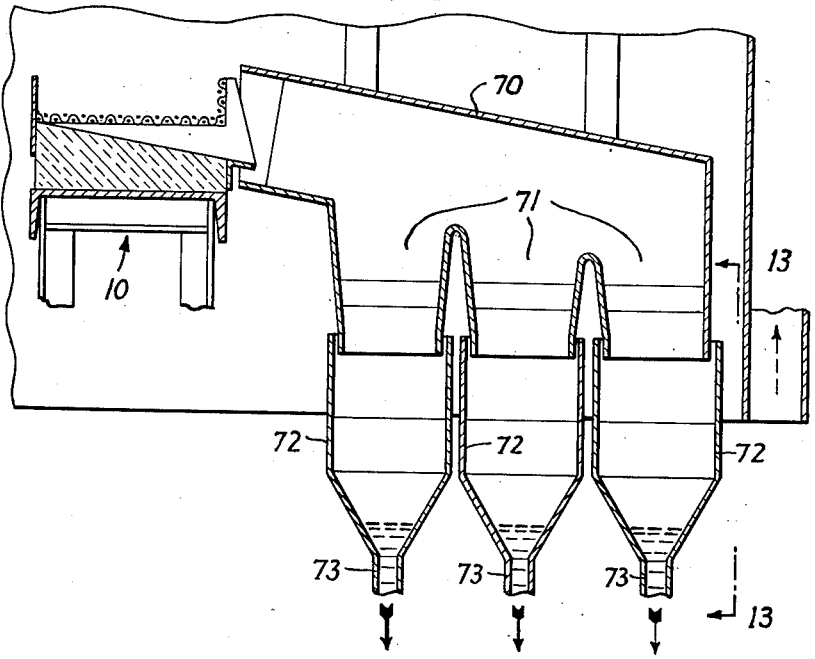
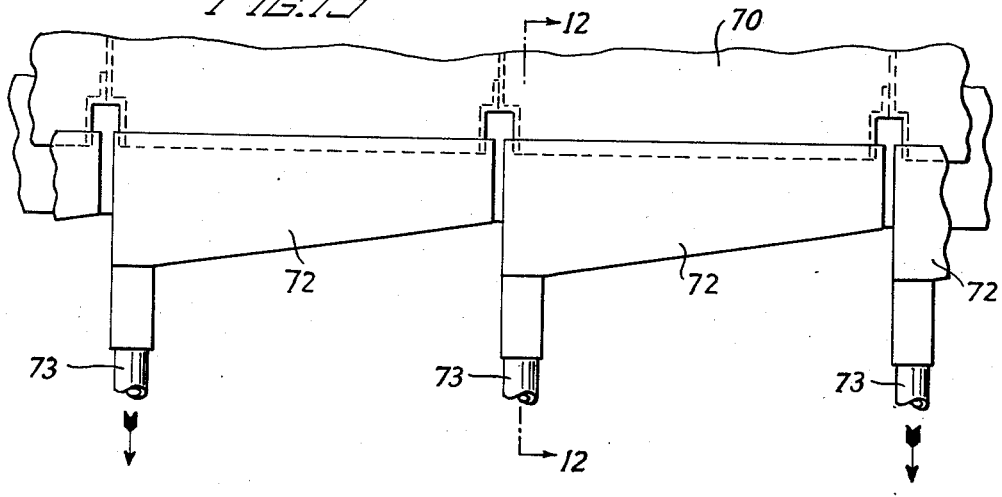
Inventor:
KINDRED L. STORRS,

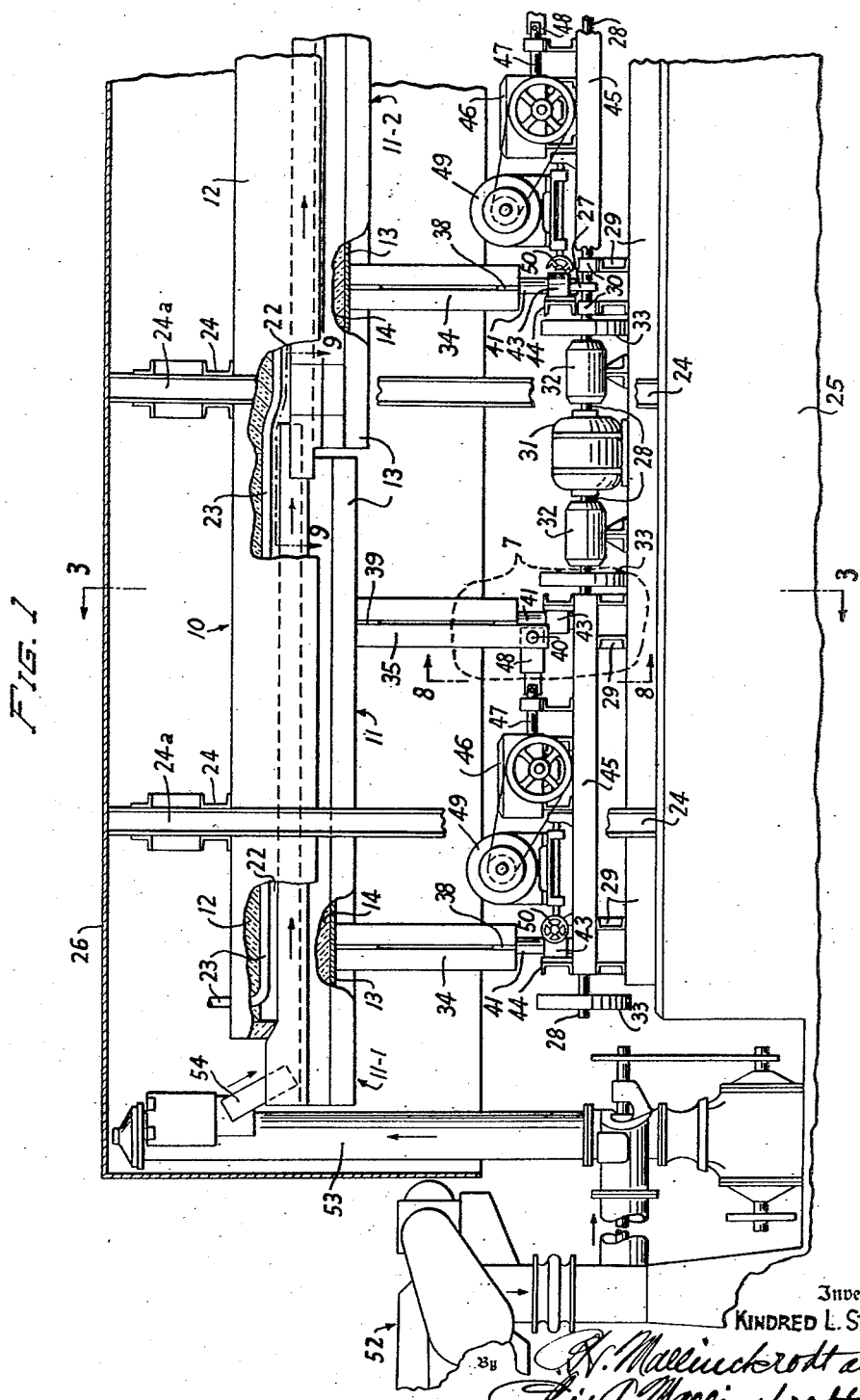

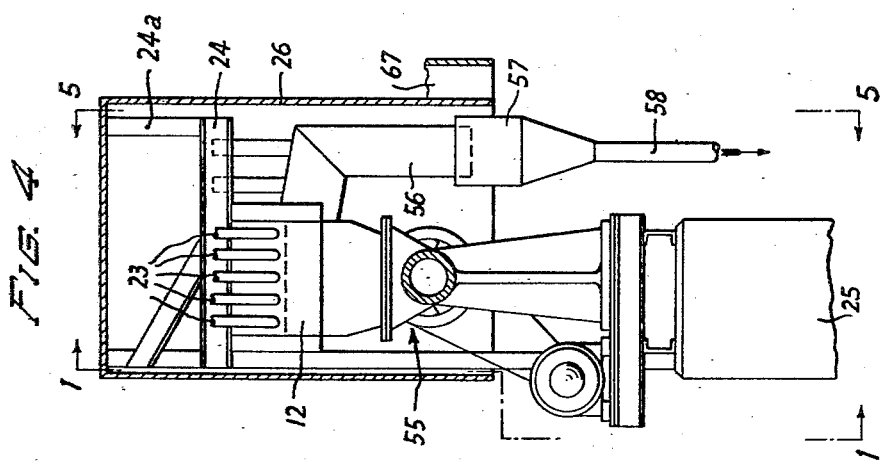
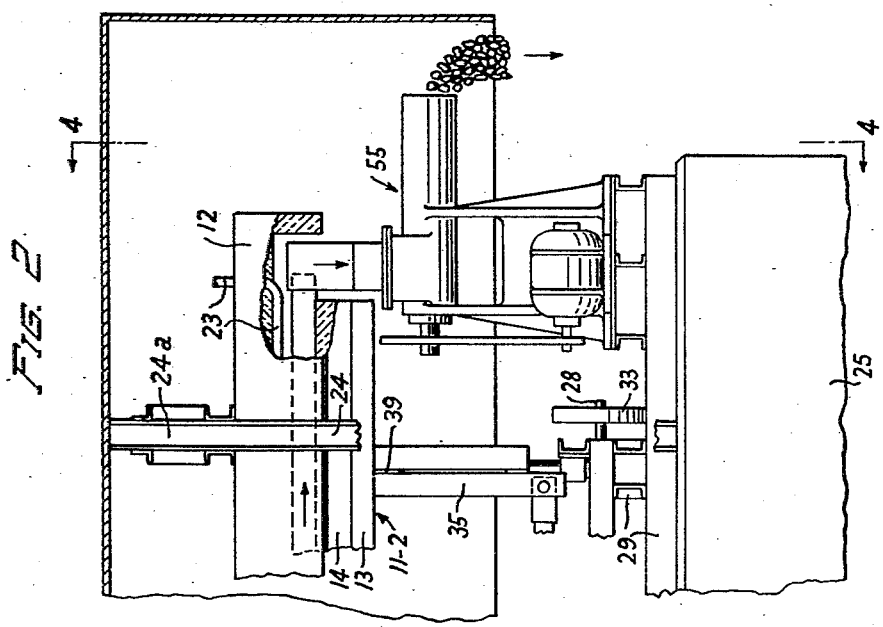

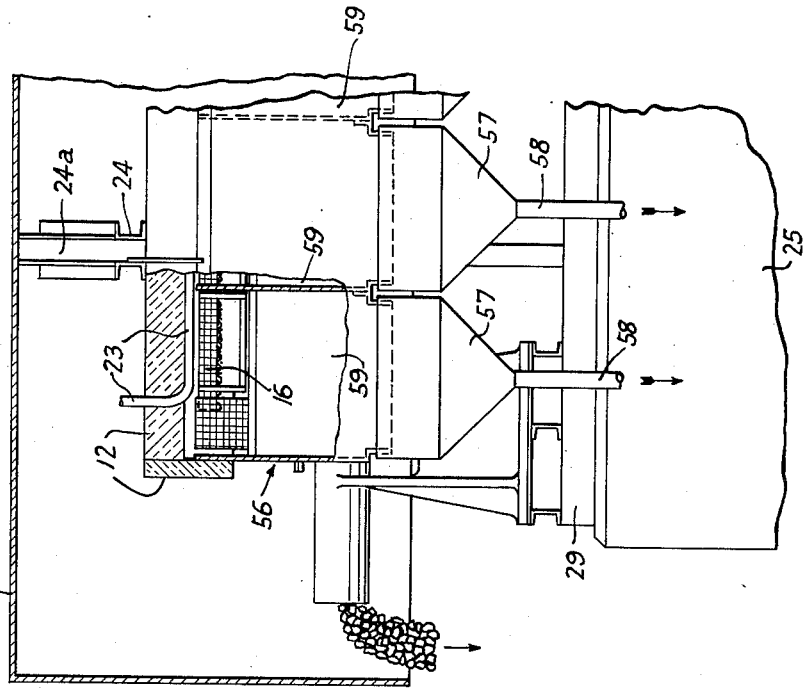
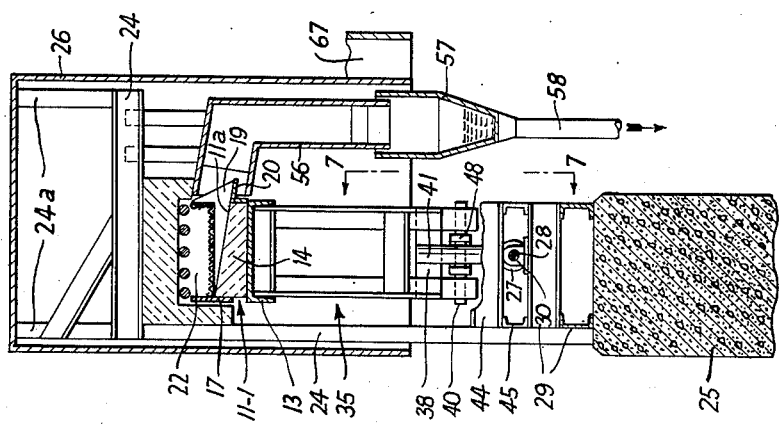

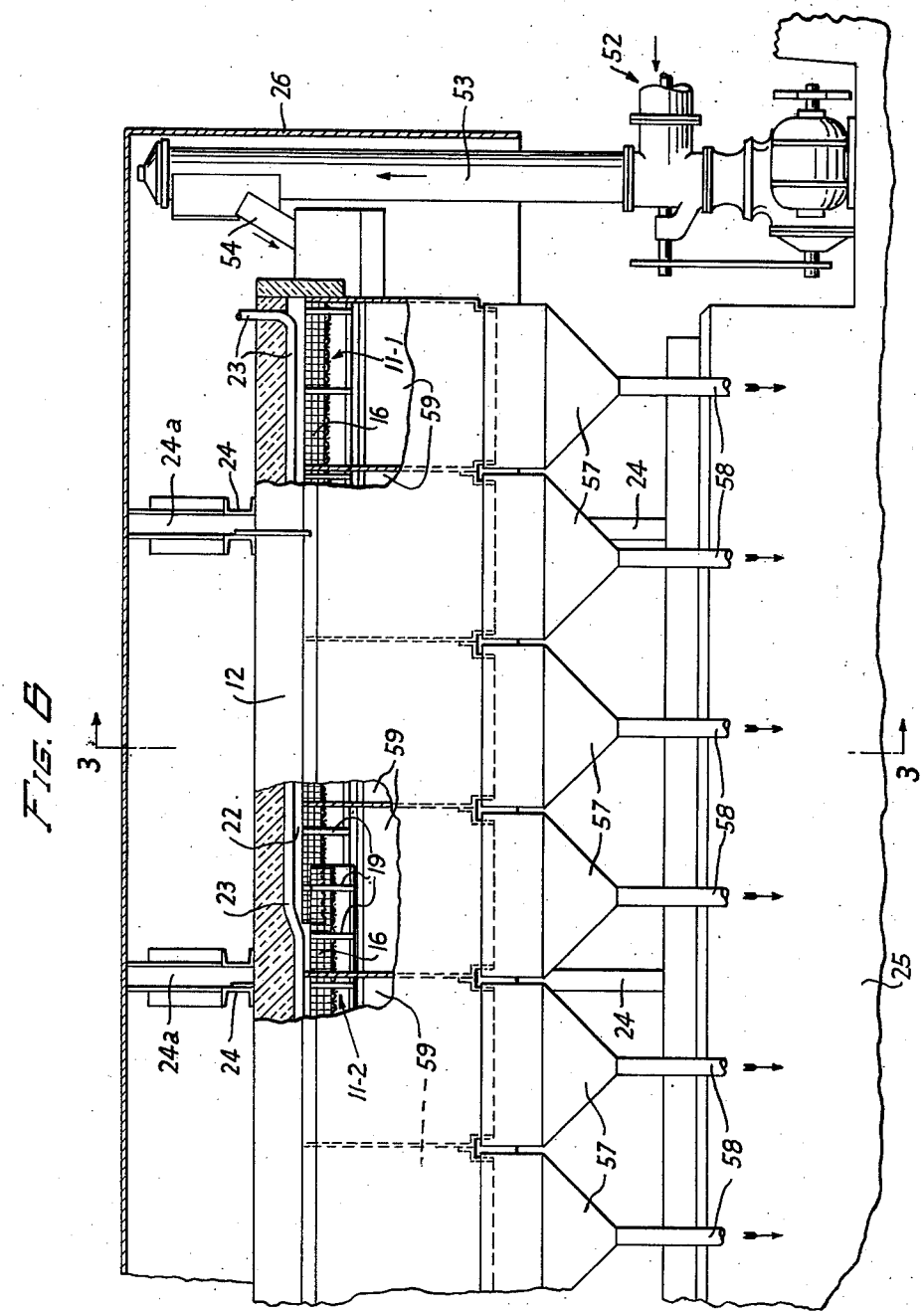

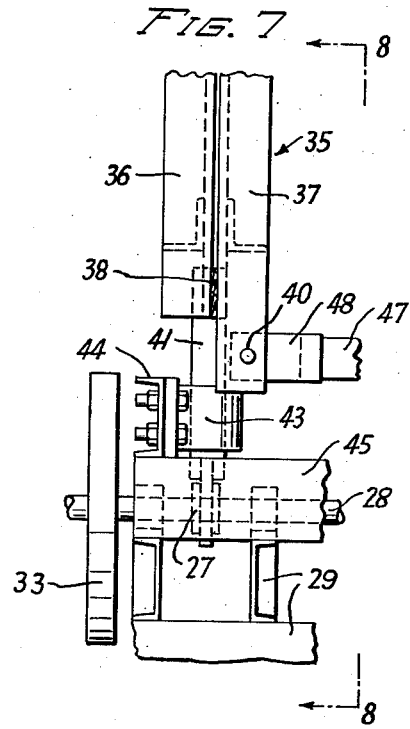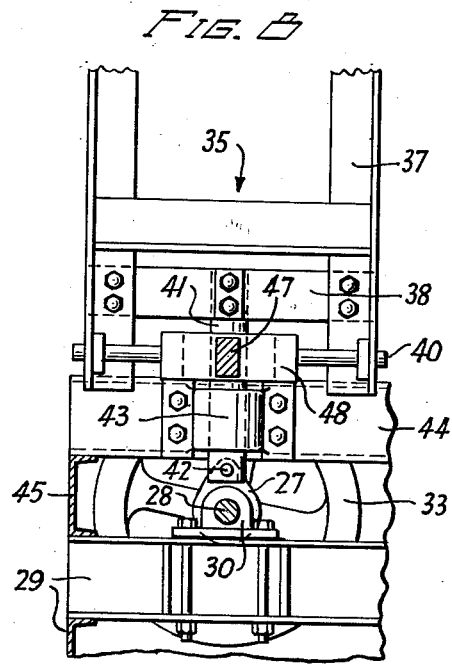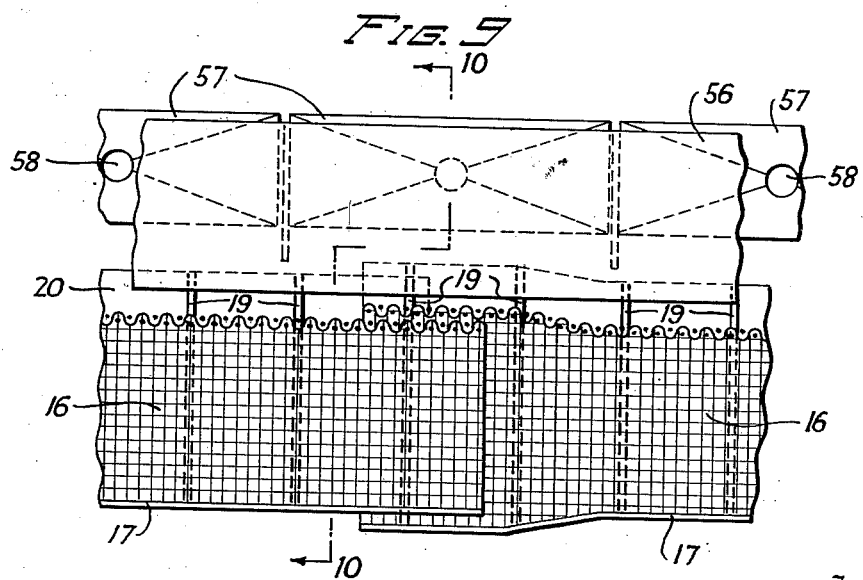

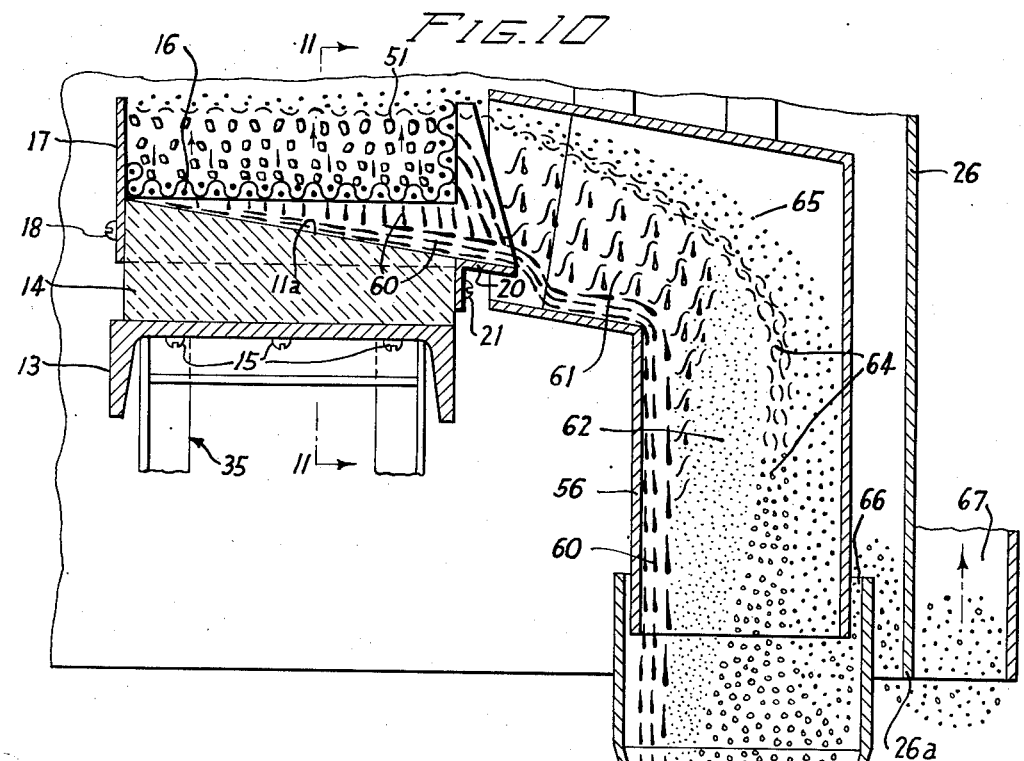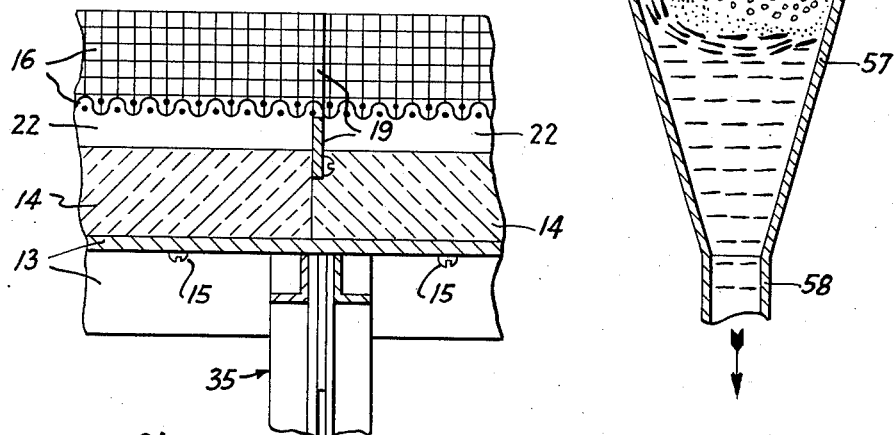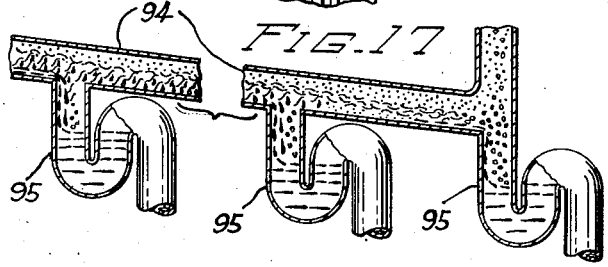

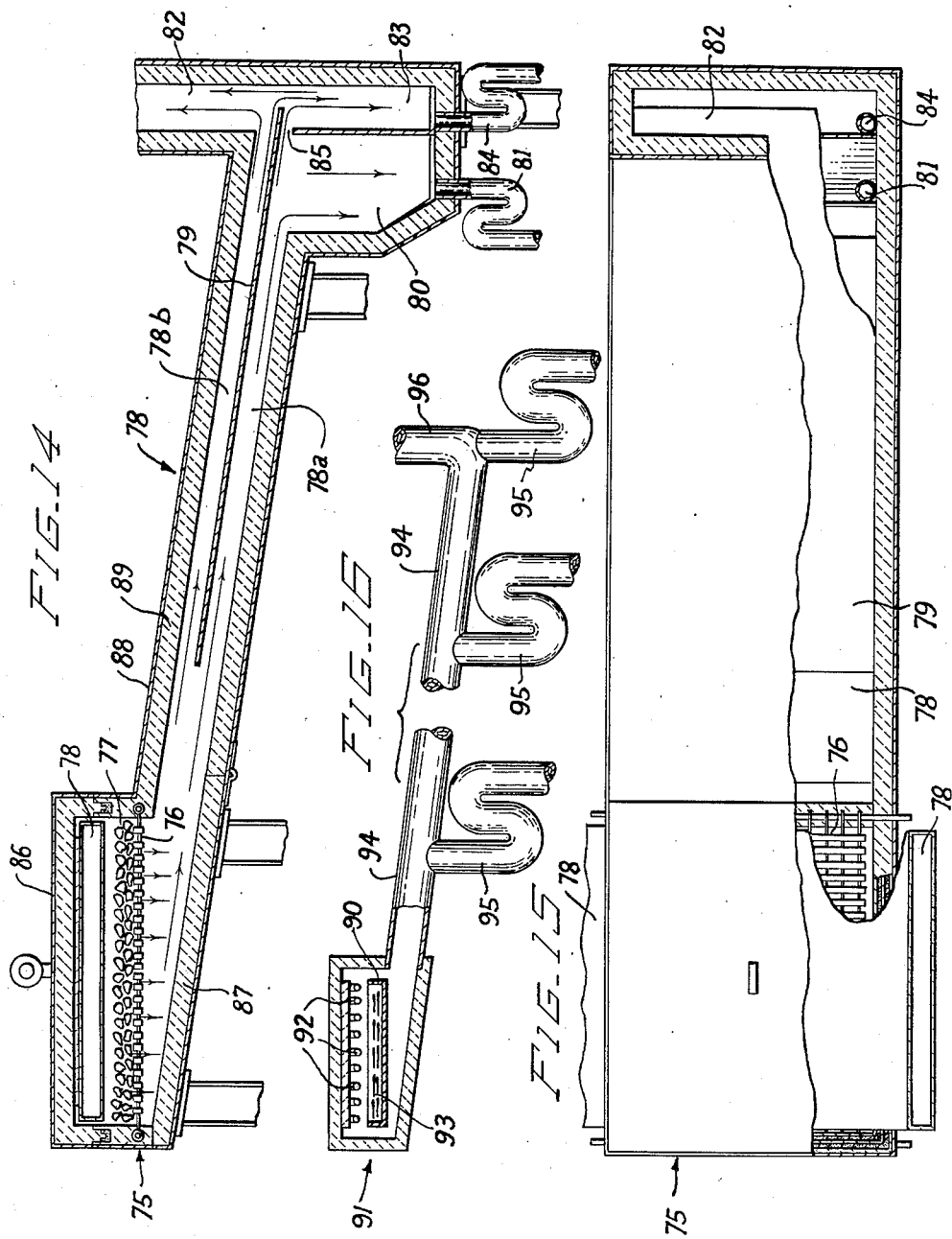

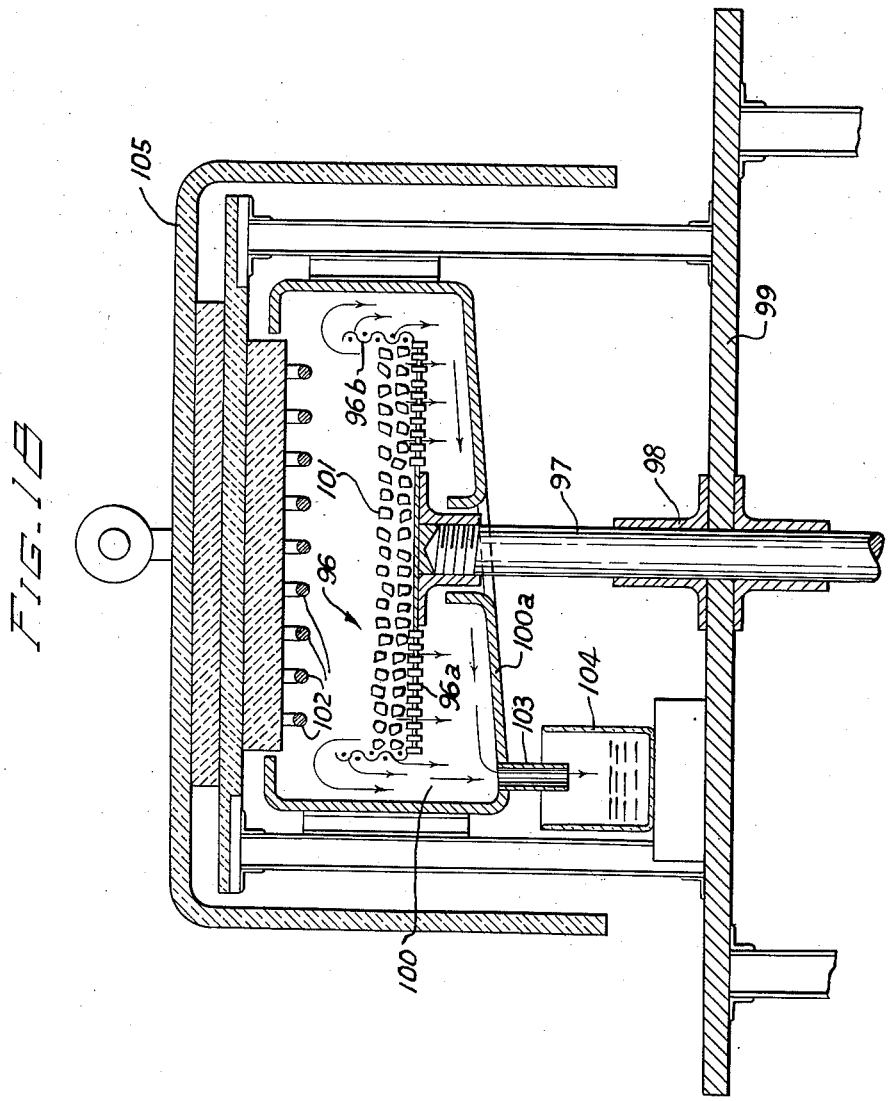

2,809,154

HEAT TREATMENT OF SUBSTANCES FOR THE RECOVERY OF DECOMPOSITION PRODUCTS

Kindred L. Storrs, Salt Lake City, Utah

Application October 15, 1948, Serial No. 54,748

24 Claims. (Cl. 202—9)

This invention relates to the heat treatment of substances for the recovery of decomposition products.

Heretofore, decomposition products have been obtained from various hydrocarbonaceous substances, such as coal and petroleum, by a process of destructive distillation involving the heating of the substance to at least the boiling points of the respective decomposition products desired. The respective decomposition products are removed in the form of vapors and gases to which sufficient heat has been imparted to reduce their density below that of the ambient air, thereby causing them to naturally ascend through eduction conduits or other offtake passages. In some cases these low density vapors and gases are caused to unnaturally descend through downwardly extending offtake passages. In either case, mechanically induced draft is applied to such offtake passages in an attempt to facilitate removal of these low density vapors and gases, a practice which is undesirable where the nature of the retort makes complete sealing against the entrance of air impossible as a practical matter. Following their removal, such low density vapors and gases are subjected to condensation procedures, usually a matter of passage through serpentine cooling coils where reduction of temperature causes liquification.

Pursuant to the present invention, it has been found desirable to impart just enough heat to the substance being treated to release therefrom recoverable constituents as liquids, which may be partially or entirely in liquid droplet form, and to initiate removal of such relatively high-density constituents as closely as possible to their points of formation and while they are in the liquid form in which they are released. This not only effects a considerable saving in heat, but prevents cracking and consequent reduction in density of these released constituents, thereby resulting in a considerably increased yield of the decomposition products.

It has been found, further, that these released constituents may be advantageously removed from the retort, as final decomposition products, merely by utilization of the force of gravity.

By permitting the force of gravity to be effective on such released constituents substantially immediately upon their release from the substance and by limiting the quantity of heat imparted to the substance in a manner determined by the particular constituents desired for recovery, such constituents may be recovered directly in their liquid form, without either the application of expensive condensation procedures or loss by cracking.

Various types of equipment may be employed in the practice of the method of the invention, the simplest being a chamber which is closed at either the top or the bottom. The substance to be treated is supported within the chamber in a way which depends upon the nature of the substance and the manner of applying the heat. Where the substance is a solid, it is often advantageous to support the same by means of a perforated plate or screen, permitting the liquids and liquid droplets to descend through the apertures thereof immediately upon formation. In such instances, the heat is advantageously applied from above.

The liquids and liquid droplets derived from the distillation of the substance are conducted away by suitable gravity-flow conduits. In instances where the substance is supported by an imperforate plate or the like during the distillation, notably in the case of liquid substances, such as petroleum, the conduits lead therefrom at approximately the level of the bed so that decomposition products in liquid droplet form may enter and descend therethrough by gravity.

A variety of substances, both solid and liquid, may be treated in accordance with the invention, the exact manner of handling being determined by the nature of the material, as can be appreciated by those skilled in the art.

Where the substance is a mass of discrete pieces or particles, and also where it is a liquid or a semi-liquid, it is highly desirable to vibrate the bed or body thereof during the procedure in order to open and ventilate such bed or body so heat may be uniformly and rapidly disseminated throughout the substance. In accordance with the invention, it has been found that an essentially vertical vibration effects the required ventilation of bed or body and the desired uniformity and rapidity of heating.

In treating many substances, for example in the carbonizing—and especially in the low temperature carbonizing—of bituminous coals and other carbonaceous materials possessing complex structures, it has been found desirable pursuant to the invention to heat the substance progressively by passing it through an elongate heating zone. Thus the temperature of the substance is progressively raised as it travels along the heating zone. As respective increasing temperatures are reached in the travel of the substance, respective characteristic decomposition products are formed. Such products are recovered substantially as and when formed along the length of the heating zone.

It is a feature of the invention that the rate of travel of the substance along the heating zone is so regulated, with respect to the heat absorptive capacity of the substance in any given physical form, and, further, with respect to the applied heat, that the respective temperatures progressively attained by the substance are substantially no greater than will release and permit the recovery of the respective decomposition products as liquids.

It is a further feature of the invention that the substance is so passed through the heating zone that removal of the primary decomposition products, that is to say, products in liquid or liquid droplet form, is effected automatically by gravity-flow, substantially as and when formed. Thus, no opportunity is afforded for the production, by cracking, of secondary decomposition products.

A continuous stream of the substance is preferably passed through the elongate heating zone, and, where the substance is a solid, it is advantageous that it be in finely divided form so as to constitute a continuous, traveling bed of massed discrete particles. By substantially vertically vibrating this bed as it travels, ventilation thereof is effected, together with localized transverse circulation of the individual particles, whereby heating of such particles is substantially uniform within the respective differential temperature areas of the bed.

The physical character of the stream along its length, once established for any given run of material, is desirably maintained constant, which means that, where the elongate heating zone is provided by a retort, as it is in preferred embodiments of apparatus utilized for carrying out the method, the feed of material to the retort is preferably maintained constant, furthermore, that even though vertical vibrations of different amplitude and rapidity be applied at different locations along the length of the stream and different rates of travel of the stream at such different locations be established, as is desirable to compensate for reduced density of the substance as it loses decomposition products, such differences be maintained constant. In this manner it is possible to maintain a constant predetermined heat input along the length of the heating zone, and to dynamically establish, along the length of the stream of material within the heating zone, a constant temperature gradient whose nature is dependent upon the heat absorptive capacity of such stream. It is advantageous, in the establishment of such temperature gradient, that heat be applied to the heating zone substantially uniformly throughout.

If the feed is varied for any reason, suitable compensating variations should be effected in either the heat applied to the heating zone, the ventilation of the bed, or the rate of travel of the stream through the heating zone. In any event, the establishment of a temperature gradient along the length of the stream of material as it passes through the heating zone—the nature of such gradient being dependent upon the heat absorptive capacity of the particular substance being treated, considering the physical characteristics of the stream—is a significant feature of the invention.

The knowledge requisite for determining the amount and rate of heat input to the heating zone and the rate of travel of the substance along the heating zone, necessary for any given substance to be treated, having due regard for the physical characteristics thereof within the heating zone, is advantageously acquired by laboratory analysis of the substance either under batch treatment pursuant to the method, as hereinafter set forth in detail, or by use of a miniature continuous retort pursuant to the method of the invention.

In the event the substance to be treated has a high moisture content, it has been found advantageous to preliminarily heat treat the substance for the removal of a large percentage of the moisture prior to treatment in accordance with the present method. This may be effected in apparatus similar to that employed for the principal heat treatment, utilizing, however, a lower temperature.

Continuous travel of a bed of material along and through the heating zone is advantageously accomplished by essentially horizontal vibration, where the bed is made up of massed discrete particles of a solid. It is a feature of the present invention that essentially horizontal vibration and essentially vertical vibration be independently applied to the bed of material and independently controlled in amplitude and rapidity to effect a close control of the process, while at the same time affording the most favorable physical conditions for heat transmission and rapid and effective recovery of the decomposition products. This manner of handling a bed of material being treated assumes unique importance in connection with the gravity withdrawal therefrom of released decomposition products in the manner explained hereinbefore.

Advantageously, the apparatus for accomplishing continuous travel of a stream of material for progressive treatment along the length of an elongate heating zone includes a vibrating base assembly made up of one or more longitudinal sections. Where more than one section is employed, both the means for imparting vertical and for imparting horizontal vibration are desirably arranged so that the several sections may be vibrated differentially. This enables compensation, in the rate of flow of the substance, for reduction in density due to the loss of certain decomposition products during the process.

Progressive gravity withdrawal of released constituents in liquid or liquid droplet form from the bed as it travels insures simultaneously recovery of various decomposition products from any given substance in a continuous process substantially without secondary decomposition or cracking, thereby enabling the economical and efficient handling of a variety of materials by apparatus which costs considerably less to construct and operate than most equipment now available.

When a liquid stream is to be treated, an adjustable gravity flow arrangement may be employed in place of the essentially horizontal vibration referred to above. This may also be employed, if desired, with massed discrete particles of a solid.

Accordingly, a principal object of the invention is to provide an improved method and apparatus for the heat treatment of substances to recover decomposition products therefrom, whereby considerably less heat is consumed, substantially no cracking of released constituents takes place, and no expensive condensation procedures are necessary.

Much heat is saved in accordance with the invention because none is required to energize released fluid constituents for the removal of same against the force of gravity in conventional fashion. Furthermore, a distinct advantage is obtained by this very saving in heat, in that no expensive condensation procedures involving special cooling are necessary for the recovery of the released fluid constituents.

Because cracking is eliminated pursuant to the invention, there is substantially no undesirable deposition of carbon on retort surfaces, and a cleaner char residue is produced. Furthermore, products heretofore commercially unobtainable are recoverable by reason of the unique control afforded by gravity withdrawal of the decomposition products.

Where tar-producing organic substances are processed, the presently disclosed recovery procedure effects a positive separation of water from the tar, whereby substantially water-free tar results as an end product.

Other important objects of the invention are:

To provide a truly accurate method of analysis of carbonaceous materials, particularly bituminous coals, thereby to determine the maximum possible yield of decomposition products;

To greatly improve the reactivity of cokes by materially reducing if not entirely eliminating the amount of graphitic carbon deposited thereon during manufacture;

To greatly reduce the production of fixed gases and water-liquor in the obtaining of decomposition products from carbonaceous materials;

To obtain the maximum yield of tars and oils and a minimum yield of fixed gases, in the processing of carbonaceous materials;

To recover most of the valuable by-products from carbonaceous materials directly in the form of liquids, rather than vapors;

To produce, commercially, from various grades and types of bituminous coals, true low-temperature tars having high phenolic content, relatively low specific gravity, and a general similarity to crude petroleum;

To produce metallurgical coke, together with a high output of tars and oils, from so-called non-coking bituminous coals;

To apply heat to the substance in a more effective manner than is customary, obtaining rapid and essentially uniform heating of the substance to required temperatures;

To materially conserve and reduce the consumption of heat in the treatment process;

To produce fractionated liquid products directly from the retort, without intermediate condensation procedures;

To eliminate undue deposition of carbon upon the retort surfaces;

To eliminate the need for externally-created differences in pressure between the retort chamber and the exit therefrom, as currently carried out by suction pumps, and hence to eliminate substantially all air from the retort chamber during the processing of the substance, without resort to seals which are expensive and cumbersome and never completely effective;

To provide a retort construction which permits for the first time the erection of a retort which (i) will not experience severe corrosion and deformation due to elevated temperatures, (ii) does not require expensive alloys save for the relatively small weight of screen-material, (iii) can be readily assembled and dismantled, (iv) will require little repair and maintenance, (v) will initially cost very much less than other retorts of equal capacity, and (vi) will have a much longer life than other retorts for low-temperature carbonization;

To produce, for the first time, a homogeneous solid fuel with respect to physical and chemical properties.

An outstanding feature of the invention, as touched upon hereinbefore, is the provision for gravity flow of the liquid and liquid droplet decomposition products of the substance being treated, away from the source of heat and substantially at the points of origin of such products. This is particularly effective when coupled with radiant heating from above the bed of substance being processed.

Additional objects and features of the invention will appear hereinafter in connection with the detailed description of the several preferred practices and forms of apparatus illustrated in the accompanying drawings by way of example.

In the drawings:

Fig. 1 represents a fragmentary side elevation, partially in vertical section taken on the line 1—1 of Fig. 4, of a retort construction presently preferred for the practice of the method;

Fig. 2, a view supplementary to that of Fig. 1, illustrating the discharge portion of the retort not shown in Fig. 1;

Fig. 3, a vertical section taken on the line 3—3 of Figs. 1 and 6;

Fig. 4, a vertical section taken on the line 4—4 of Fig. 2;

Fig. 5, a view corresponding to that of Fig. 2 but taken on the line 5—5 of Fig. 4;

Fig. 6, a view corresponding to that of Fig. 1 but, as in the case of the immediately preceding figure, taken on the line 5—5 of Fig. 4;

Fig. 7, an enlargement of that portion of Fig. 1 comprehended by the dotted line 7, the view being taken from the back as a rear elevation of such portion, see the line 7—7, Fig. 3;

Fig. 8, an enlarged fragmentary vertical section taken on the line 8—8 of Fig. 1 (see also Fig. 7);

Fig. 9, an enlarged fragmentary horizontal section taken on the line 9—9 of Fig. 1;

Fig. 10, an enlarged fragmentary transverse vertical section taken on the line 10—10 of Fig. 9 and schematically illustrating the practice of the method of the invention so far as the illustrated apparatus is concerned;

Fig. 11, a fragmentary longitudinal vertical section taken on the line 11—11 of Fig. 10;

Fig. 12, a fragmentary vertical section corresponding to that of Fig. 10, but taken through apparatus having somewhat different decomposition product removal structure;

Fig. 13, a fragmentary side elevation taken on the line 13—13 of Fig. 12;

Fig. 14, a central vertical section taken longitudinally through another type of retort pursuant to the invention, the same being an adaptation of a widely used coking retort to the practice of the invention;

Fig. 15, a top plan view partly in horizontal section of the retort of Fig. 14;

Fig. 16, a side elevation partly in vertical section, drawn to a reduced scale, of a slightly different form of the retort of Figs. 14 and 15;

Fig. 17, a fragmentary, longitudinal, vertical section taken centrally along the recovery conduit of Fig. 16, showing, schematically, horizontal stratification and gravity discharge of decomposition products; and Fig. 18, a central vertical section taken through a form of analytical retort in accordance with the invention.

Referring now to the drawings: The apparatus illustrated in Figs. 1 through 11 is adapted to effectively carry out the method of the invention with respect to massed discrete particles of a substance to be treated, especially properly sized bituminous coals.

The apparatus is arranged for continuous operation and the progressive withdrawal of decomposition products along the length of a traveling stream of the substance being treated.

Heating is carried out within an elongate retort 10, see especially Fig. 1, made up of a heat-insulating base assembly 11, which, as here shown, consists of two elongate sections 11-1 and 11-2 arranged in end-to-end overlapping relationship, and a heat-insulating cover 12 extending over both base sections. Both the base assembly and the cover advantageously include in their make-up a structurally strong, lightweight, inorganic, heat-insulating material, such as that produced and sold by the Johns-Manville Corporation under the trade name "Marinite." This and generally similar materials are available on the open market in lengths which may be sawed and otherwise worked to the desired formation.

In the illustrated instance, see Fig. 3, the superficial retort surfaces 11a of the two component sections of the base assembly 11 slope from the one side to the other, affording gravity flow for liquids laterally of the retort along one side thereof. Nevertheless, such surfaces may slope from their respective centers toward both sides of the retort in instances where it is desired to withdraw decomposition products from both sides.

Each section of the base assembly 11 advantageously comprises a light-weight structural channel 13, supporting a composite length 14 of the heat-insulation material afore-referred to. The top of each of said lengths 14 provides one of the aforementioned superficial retort surfaces 11a, and is preferably treated with heat-resistant, pore-closing materials, such as are made up by the Kraus Research Laboratory of Sparks, Maryland, and available on the open market under the trade designations "Kaycote 3384" and "Top Dressing 3385." Other generally similar materials are on the market, and may be utilized in place of these particularly specified.

The lengths 14 of heat-insulation material are conveniently each made up of a number of shorter blocks of the material, and are firmly secured to their respective supporting channels 13, as, for example, by means of screws 15, Figs. 10 and 11, passing through the channel webs and threading directly into said material.

Disposed horizontally upon the retort base surfaces 11a, and extending longitudinally therealong, are respective elongate perforate troughs 16, which provide the channel through which the substance to be treated passes in its travel through the retort.

In the illustrated instance and as presently preferred, each perforate trough 16 is made largely of woven wire screen of mesh sufficiently fine to retain the particles of substance being treated but sufficiently coarse to permit substantially free passage therethrough of liquid and liquid droplet decomposition products. The mesh must be determined in any given instance by the nature of the material being processed and by the particle size thereof. In the case of various bituminous coals, the maximum particle size is preferably from ½ inch to plus ¼ inch for any given run, and the minimum particle size from minus 20 mesh to plus 40 mesh for any given run. In the first instance, a screen of $\frac{1}{16}$ inch openings has been found satisfactory, and in the last instance a screen of 35 mesh with 50 percent void. Generally speaking, the screen is of as large a mesh and has as great percentage of void as possible consistent with particle retention and support.

Since, in the present embodiment, decomposition products are removed along only one longitudinal side of the retort, only the bottom and that side of the troughs 16 are of wire mesh. The opposite longitudinal sides of the respective troughs are formed by respective plates 17, which are firmly secured to the base lengths 14, as, for example, by means of screws 18, Fig. 10. At intervals along the length of each base section 11–1 and 11–2, the heat-insulating lengths 14 are transversely grooved to receive and position transverse trough supports 19, see particularly Figs. 9, 10, and 11.

Along the said one longitudinal side of the retort at which decomposition products are removed, light-weight metal angles 20 are firmly secured to the respective base lengths 14, as, for example, by means of screws 21, to serve as discharge lips whereby liquid decomposition products may flow into suitable discharge conduits hereinafter described.

The insulating cover 12 has longitudinal sides and ends which depend over the base assembly 11 and define an elongate retort chamber 22, within which the perforate trough 16 is positioned. The cover 12 does not make a close and tight fit with the base assembly 11, for the latter must have freedom of motion relative thereto. Nevertheless, it is preferable that a close and tight fit be made with the offtake structure for decomposition products in order to properly direct such decomposition products for discharge. Thus, as illustrated, a close fit of the cover 12 with the offtake structure is made at the ends of the retort, see Figs. 5 and 6, and along the discharge side, see Fig. 3.

Along the inner ceiling surface of the insulating cover 12 are disposed longitudinal, electrical resistance, heating elements 23, which radiate intense heat downwardly upon the stream of substance to be treated flowing along perforate troughs 16. Such heating elements are conveniently molded into the insulating material of cover 12, as illustrated, and are energized through a conventional electric power circuit (not shown). It is advantageous that the retort be equipped with automatic temperature controls, which may be of any suitable standard type, so that the heat within the retort will not exceed a predetermined maximum.

The cover 12 is suspended in position above the base structure by cantilever supports 24 rising from foundation 25, see particularly Figs. 1 and 3. Upward extensions 24a of the cantilever supports serve to receive and support an elongate hood 26, which extends along the entire length of the retort. The hood 26 is closed at its ends, sides and top, but has an open bottom. Accordingly, all air is forced out of the retort and vicinity by the displacement action of the hot fixed gases generated during the distillation procedure. Air is completely and effectively eliminated, and no suction pump is necessary as in conventional methods of distillation. It will be noted that the nature of the open outlet for evacuation of air from the retort is such that there is substantially no restriction on the displacement action of the fixed gases. Thus, the retort will be maintained throughout the processing operation at a slightly—but only a slightly—higher fluid pressure than the outside atmosphere. This means that there is no excessive pressure within the retort to restrict formation and migration of liquid droplets, and, furthermore, that the velocity of outflowing fixed gases is not so great as to impel migration of such liquid droplets against the force of gravity.

It is a feature of the invention that the stream of massed discrete particles of the substance to be treated is ventilated during passage through the retort so heating will be rapid and substantially uniform throughout the mass. Pursuant to the invention it has been found that this is most advantageously and effectively accomplished by subjecting the surface over which the stream of substance passes to essentially vertical vibration. In the illustrated instance, the troughs 16 and base assembly 11 upon which they rest are mounted for substantially vertical vibration to effect stream ventilation. In addition, they are mounted for substantially horizontal vibration to effect propulsion of the particles of the substance from feed end to discharge end of the retort. The two types of vibration are independently applied, so that each may be adjusted independently of the other to effect any desired degree of control of stream movement through the retort.

In a retort designed for the flow of a stream of liquid, or even massed discrete particles of a solid, travel of the substance along the supporting surface can be most advantageously attained by sloping the surface from feed end to discharge end, so that gravity replaces horizontal vibration as the motivating force. Suitable slope-adjusting means then affords control of the rate of material flow through the retort. From the standpoint of stream ventilation, a stream of liquid may be regarded as being made up of massed discrete particles since the action of the vertical vibration produces substantially the same results in both instances.

The vertical vibrating means in the present instance take the form of a series of standard eccentric mechanisms 27, Figs. 1, 3 and 8, mounted on longitudinally extending drive shafts 28 and connected with the base structure of the retort by means of respective reed structures presently described. The drive shafts 28 are rotatably supported on foundation superstructure 29 by a series of bearings 30, and are rotated by an electric motor 31 through respective variable speed drives 32 of standard construction. A series of flywheels 33 are fixed to the drive shafts 28 at intervals, as illustrated.

Two types of special reed structures are employed, one type, indicated 34, being designed to transmit only vertical vibration, and the other, indicated 35, being designed to transmit both vertical and horizontal vibration. In the illustrated embodiment two of each type are provided in connection with each of the base assembly sections 11–1 and 11–2. Both types are essentially similar in construction, that indicated 35 having an added depending portion for connection with horizontal vibrating means.

In Figs. 7 and 8 one of the special reed structures 35 is illustrated in detail. It comprises two frames 36 and 37 positioned back-to-back, with a transverse vibratory reed 38 interposed therebetween adjacent the lower end of the structure, and a transverse spacer element 39, Figs. 1 and 2, at the upper end. The frames are preferably made up of structural steel elements, as illustrated, and are firmly secured to the underside of channel 13 of the retort base assembly 11, as by means of welding. The frame 36 is somewhat longer than the frame 37 so as to depend lower, and has a transverse pin 40 journaled in its depending lower end for connection with horizontal vibrating mechanism about to be described. The reed 38 is advantageously of wood having sufficient flexibility and strength for the purpose, but may be of any other suitable material, such as a resilient steel. Hickory has proved to be a satisfactory wood for the purpose.

The eccentric mechanisms 27 on the shaft 28 are connected with the vibratory reeds of the respective reed structures 34 and 35 by means of connecting rods 41, a pivotal connection 42, Fig. 8, between eccentric mechanism and connecting rod being provided. The connecting rods extend vertically through respective bearings 43, and are advantageously bolted directly to the vibratory reed 38 in the manner illustrated. The bearings 43 are preferably bolted to respective transverse structural channels 44 which rest on longitudinal channels 45.

Rotation of the shaft 28 by means of motor 31 causes the base assembly 11 of retort 10 to be rapidly vibrated in a vertical direction, the reed structures 34 and 35 serving to transmit vertical vibratory motion imparted by the eccentric mechanisms 27. The stroke and rate of this vertical vibration will vary in practice in accordance with the particular material being treated and the nature of the decomposition products to be recovered. With most types of finely ground bituminous coals the stroke will vary from ⅛" to ½" and the rate from 1290 to 650 vibrations per minute, respectively.

A preferred arrangement for imparting horizontal vibratory motion to the retort base assembly 11 includes a vari-throw, vari-speed, quick-return mechanism, such as a standard Wilfley-type head motion 46, Fig. 1, whose respective drive shafts 47 are attached to the pins 40 of the respective reed structures 35 by means of yokes 48. Respective motor and variable speed drive units 49, adjustable by means of hand-wheels 50, serve to power the horizontal vibrating mechanisms 46.

It should be noted that by suitably adjusting the vibrating mechanisms associated with the respective base assembly sections 11–1 and 11–2, the two sections may be differentially vibrated. This is important where reduction of density of the substance during passage through the first section necessitates a difference in the stroke and/or rate of vibration of the second section to insure proper flow of the stream of the substance through the retort.

The vibratory reed 38 of each reed structure 35 flexes sufficiently during operation of the apparatus to accommodate both of the independently applied vertical and horizontal vibratory motions.

It should be particularly noted that the two types of vibration-imparting means may be independently adjusted with respect to both the length of stroke and the speed of vibration, thereby affording a wide range of control for particle movement within and along the retort.

As indicated somewhat schematically in Fig. 10, the stream 51 of massed discrete particles of the substance being treated is ventilated during its flow through the retort, this being due to the applied vertical vibration. Flow of the stream is due to the applied horizontal vibration.

The substance is fed into the retort by any convenient and suitable means. As illustrated, a constant weight feeder 52, such as that manufactured and sold by The Jeffrey Manufacturing Company under the name of "Waytrol," continuously feeds a substantially uniform quantity of the substance to an elevating mechanism 53, which passes it to the feed end of the retort 10 by means of a feed chute 54. The temperature of the substance as fed to the retort is taken into account in regulating the rate of travel of the substance through the retort.

The char discharge from the retort may pass through an extrusion unit for compression into the form of so-called logs, or may drop into a suitable conveyor, such as that indicated 55, Figs. 2, 4 and 5, positioned at the discharge end of the retort.

In the passage of the substance along the length of the retort from the feed end to the discharge end thereof, decomposition products are progressively derived in accordance with the progressive temperature rise of the substance along the length of the retort. Atlhough heat be applied substantially uniformly along the length of the retort, as is preferable in most instances, progressive heat absorption by the substance in its travel through perforate trough 16 produces a progressive temperature rise thereof and a progressive release of a variety of decomposition products.

The progressive release is considerably facilitated by the fact that the traveling stream of massed discrete particles is ventilated during its travel by reason of the applied vertical vibration, and by the fact that the extent of such ventilation can be adjusted to the speed of travel, having due regard to particle size and to the heat absorptive capacity of the substance.

It is a feature of the method of the invention, and of the apparatus here disclosed for practicing the method to best advantage, that the decomposition products are produced as liquids, either in the form of a free-flowing stream or of a mass of free-falling liquid droplets, or a combination of both, which liquid is recovered from the points of formation at the substance substantially without diminution of density.

This is accomplished by, first, permitting the substance to absorb at any given time substantially only that quantity of heat required to produce a given decomposition product, second, by providing for the operation of the force of gravity upon such decomposition product substantially immediately upon formation, and, third, by removing such product from the zone of heat application by means of gravity and substantially without increase in volume.

In the use of the apparatus heretofore described, heat is radiated downwardly upon the ventilated stream of material 51 substantially uniformly along the length of the retort 10, and, because of the open interstices between the particles and their dancing motion transversely of the direction of travel, heats such particles rapidly and substantially uniformly to progressively advanced temperatures as they travel, resulting in the progressive formation of a variety of decomposition products. Such products pass through the interstices between the particles and through the perforations of the trough 16 almost immediately upon formation, a large portion thereof usually being in the form of a cohesive liquid flow. Whatever liquid droplets are produced also descend by gravity through the interstices and perforations or across the surface of the stream, somewhat as illustrated in Fig. 10. These products fall upon the laterally sloping treated surfaces 11a and flow over the respective discharge lips 20.

In the presently considered instance, the decomposition products passing over the lips 20 discharge into a longitudinally sectionalized discharge conduit 56, paralleling the retort 10, and drop into respective funneled receiving vessels 57 which extend up under the hood 26. Respective pipes 58 conduct the received products to suitable tanks for storage, or elsewhere as may be found desirable. The number of individual sections 59 into which the discharge conduit 56 is divided, is determined in any instance by the nature of the substance to be treated and by the desired character of the decomposition products to be derived.

In the low-temperature carbonization of bituminous coal within the retort 10, laboratory observations have indicated that the recovery of decomposition products follow generally the schematic showing of Fig. 10. Liquid products 60 drain from the troughs 16 onto the surfaces 11a of the base assembly 11, and flow laterally over the respective discharge lips 20 into the longitudinally sectionalized recovery conduit 56, segregation of such products along the length of the retort being accomplished by the sections 59 of the recovery conduit. Liquid droplets 61 of the decomposition products hug the surfaces of such liquid flow 60 and gradually merge therewith, somewhat as illustrated, any fine mist 62 continuing to hug the surface until mergence takes place. Water vapor 64 and fixed gases 65 tend to stratify, somewhat as illustrated, and descend with the heavier products until release is afforded at the open meeting 66 of recovery conduit 56 with the receiving vessels 57. Flow thereof from the apparatus takes place under the adjacent longitudinal edge 26a of hood 26 and upwardly through the longitudinally elongate disposal stack 67.

In the embodiment of Figs. 12 and 13, the structure and arrangement of the retort per se corresponds to that of the retort 10, and is therefore identified by the same reference number, 10. The structure for decomposition product recovery is, however, somewhat altered for the achievement of a more comprehensive product segregation and a more efficient product recovery.

The longitudinally sectionalized recovery conduit, here designated 70, has a greater horizontal dimension than vertical, which means that there is greater confinement of the original product stratification against change, and hence a recovery which is more truly in accord with product formation. Furthermore, there is lateral sectionalization, as represented by the series of individual spouts 71, and, therefore, product segregation laterally as well as longitudinally of the retort. To accommodate such lateral segregation of decomposition products, a multiplicity of receiving vessels and disposal pipes—here designated 72 and 73, respectively—are provided.

It should be noted that the hood 26, with its closed top, ends, sides and open bottom, effectively excludes air from the retort 10 during the processing, without the need of seals of any kind. The displacement action of the hot gases and of the decomposition products prevents influx of air through the open bottom of the hood.

It should also be noted that, as an important feature of the invention, the decomposition products are produced as liquids and are retained in their liquid stage for and during the removal of same from the retort, in contradistinction to conventional distillation processes where cracking is unavoidable and, in fact, purposely carried on. Thus, there is no need to employ conventional condensation procedures for product recovery.

As illustrated, the foregoing embodiments of the invention are adapted especially for low-temperature treatment of substances, for example, the low-temperature carbonization of bituminous coals wherein the applied heat does not normally exceed 750° centigrade in temperature. This low-temperature range is conducive to the production of a variety of products, such as tars, oils, and resins. The residue or char provides an effective smokeless fuel. In general, bituminous coals may be raised in temperature to produce a smokeless char at the rate of from approximately 100° to approximately 500° centigrade per minute, depending upon the heat absorptive capacity of the bed of material. Where it is desired to manufacture high-temperature coke in the instance of the treatment of various types of coals, including so-called non-coking bituminous coals, preferred practice of the invention is to form the char residue of the low-temperature stage into logs by passing it through a tubular extrusion unit preferably equipped with an ordinary sausage-machine type of extrusion worm, and to pass the so-formed logs through a second retort generally similar to that illustrated and described, but in which vertical vibration is eliminated and temperatures are suitably raised to the coking range. Pursuant to the invention, the rise in temperature of the low-temperature char to produce high-temperature coke is at the rate of approximately 10° to approximately 20° centigrade per minute depending upon the heat absorptive capacity of the material in its log form.

The embodiment of Figs. 14 and 15 shows another manner of practicing the invention, the particular retort structure illustrated being an adaptation of a conventional coke oven to the purposes of the invention.

The oven proper, 75, is tightly closed against the influx of air, and is provided with a dump type grid or grating 76 upon which the coal 77, or other substance to be treated and converted into coke, is bedded. A flue 78, spaced above the grating 76 and extending substantially coextensive therewith, serves to conduct heating gases through the oven so as to radiate coking heat downwardly upon the bedded coal 77. Decomposition products in essentially liquid form drain through the grating 76 into a gradually sloping recovery conduit 78, which is advantageously divided into a lower section 78a and an upper section 78b by a partition 79. The liquid and liquid droplet products flow through the lower section 78a to a sump 80 and trapped discharge pipe 81, while the lighter water vapor and fixed gases pass through the upper section 78b to a stack 82 and a salvage sump 83 and trapped discharge pipe 84. There is preferably a passage 85 leading from the upper part of the sump 80 to the upper part of the salvage sump 83 to permit any water vapor or fixed gases entrained with the liquid droplets in the lower conduit section 78a to discharge through stack 82 of the salvage sump. A removable cover 86 for the oven proper 75 permits access thereto from above, while a hinged door 87 below the grid or grating 76 permits removal of the coke when formed, or, if the oven is used for low-temperature carbonization, removal of the char.

The structural parts of this embodiment may comprise a sheet metal shell 88 lined with refractory or other heat insulation 89. Obviously, operation of this retort is a batch proposition.

Another embodiment, somewhat similar to that described but more suitable for low-temperature carbonization, is illustrated somewhat schematically in Fig. 16. As shown, the embodiment is arranged to treat a liquid such as petroleum.

A pan 90 is arranged within the oven proper 91 of the retort structure, below electrical resistance heating elements 92. The pan is adapted to hold a quantity of a liquid substance 93 to be treated, and has an open top, with the area of which the pattern of heating elements 92 is substantially coextensive so the substance is heated from above by radiant heat, as in the prior embodiments. The floor of the oven proper 91 slopes to the open mouth of a tubular recovery conduit 94 which itself slopes downwardly along a gradual incline of preferably 5° to 10°. As the incline approaches 45°, and goes beyond, stratification becomes less efficient so far as the purposes of gravity segregation and recovery are concerned. Therefore the gradual downward slope aforementioned is ordinarily preferred. Trapped discharge pipes 95 lead from the bottom of recovery conduit 94 at intervals along its length, and a stack 96 for the discharge of fixed gases is located at the termination of the recovery conduit. As in the prior embodiment, the entire retort is tightly closed and sealed against the influx of air, sealing being a simple matter in those instances where vibration of the substance to be treated is not involved.

In operation, the decomposition products, which in this instance are in the form of liquid droplets since the substance is a liquid to begin with, mushroom and drop over the sides of the pan 90 under the influence of gravity, collecting in large part on the floor of the oven proper 91 and flowing downwardly along recovery pipe 94 to discharge through pipes 95. The gravity flow along the essentially horizontally disposed, but downwardly sloping, recovery conduit 94 is stratified from heaviest products on the bottom to lightest on the top, somewhat as shown schematically in Fig. 17, so that segregation is had between the respective discharge or offtake pipes 95. It should be noted that this type of recovery conduit is especially effective as against one vertically disposed, in that the stratified products are confined against undue vertical expansion and a consequent unavoidable diminution of density.

The embodiment of Fig. 18 shows how the inventive concepts can be applied to the analysis of a substance in laboratory practice to achieve a truly representative quantitative determination of the liquifiable constituents thereof, and to derive the requisite knowledge as to heat absorptive characteristics, etc. for controlling the procedure with respect to any given substance.

A perforate pan or container 95, here formed of a grid or grating 96a, as the bottom, and wire mesh 96b, as the peripheral side walls, is rigidly mounted on the upper end of a stem 97 whose other or lower end is connected to suitable means for imparting vertical vibration (not shown). The stem 97 passes through an elongate sleeve bearing 98 secured to a supporting table 99.

The pan 96 is disposed within a retort chamber 100, and is adapted to hold a quantity of massed discrete particles of the substance 101 to be analyzed. Electrical resistance heating elements 102 are arranged above the open top of the pan 96 for radiating heat downwardly upon the ventilated mass of substance 101, to effect release of the various decomposition products. A rheostat or other suitable control (not shown) is utilized to regulate the time rate of temperature rise within the retort, and a thermocouple or the like (not shown) is provided in well known manner for limiting the heat within the retort to a predetermined maximum.

Decomposition products in liquid and liquid droplet form, released progressively from a time standpoint in accordance with the heat absorbed by the substance, drain from the pan 96 under the influence of gravity, somewhat as indicated by appended arrows, and flow along the sloping bottom 100a of the retort chamber 100 to discharge through the recovery conduit or pipe 103 at the low point of said sloping bottom 100a.

The liquid products, and liquid droplets which merge thereinto, are caught in a beaker 104 for quantitative, and if desired, qualitative determination. As many beakers as necessary to catch the various decomposition products may be utilized, a beaker employed to catch one product being replaced by another at such time as it is determined from observation or calculation that a different product is being recovered.

A removable hood 105 prevents access of air to the retort chamber 100 during the process, the said hood extending below the open bottom end of the recovery conduit or discharge pipe 103, as illustrated.

While, for the progressive heating of a stream of material passing through an elongate heating zone, such as the retort of Figs. 1 to 11, elongate electrical resistance heating elements, radiating a sufficiently uniform quantity of heat along their lengths, have been found to be very satisfactory in practice, such progressive heating may be accomplished in other ways. For example, various fuels, such as gas, oil, or powdered coal may be employed, and the products of combustion passed through a flue or duct which extends along the length of the heating zone, the flow of products of combustion passing either in the same direction as, or counter to, the flow of the stream of substance through the heating zone.

Furthermore, in some instances it may be advantageous to apply differing quantities of heat at various locations along the length of the heating zone. So long as this is done without negativing the recovery of decomposition products in the manner specified, it is included within the generic purview of the invention.

Nevertheless, an important feature of the invention, as hereinbefore explained, is the creation of a temperature gradient or successive heat zones along the length of the bed of substance in its travel through the heating zone, by reason of the heat absorptive characteristics of said bed, when the heat input is substantially uniform along the length of the heating zone. Such uniform heat input will result in substantially a uniform temperature throughout the heating zone, except insofar as such temperature tends to simulate, though on a somewhat higher scale, the temperature gradient of the traveling substance due to the relative cold character thereof as it enters the heating zone. Generally speaking, the heat input for any particular substance will be determined on the basis of the total amount of heat required per unit weight of the substance to raise the same to the desired end temperature, having due regard to the physical characteristics of the bed of material and unavoidable heat losses in the given instance.

While heat radiated downwardly upon the traveling stream of material, or upon a batch quantity of same, is a decidedly advantageous way of applying the heat, especially in view of gravity withdrawal of the decomposition products, the heat may be applied otherwise, so long as suitable precautions are taken against overheating and cracking the decomposition products once they are formed. For example, a heating duct may be located below the container holding the substance to be decomposed, so long as any walls thereof not directed toward the substance are either sufficiently heat insulated or not disposed to affect the decomposition products as they are drained from the container.

In some instances internal heating of the substance by electrical means, such as infra red rays or short waves, may prove advantageous in securing uniformity of heat treatment of a substance at any given temperature; also, contact heating by a suitable fluid, such as hot gases, disseminated throughout the mass may be resorted to in suitable instances, for example, where inorganic materials are treated pursuant to the invention.

The apparatus for treating a substance progressively and establishing the said temperature gradient or successive heat zones along the length of a traveling bed thereof is advantageously as here specifically set forth and described, wherein independently variable vertical and horizontal vibrations are applied to a retort along the length thereof, this being in accord with one of the more specific aspects of the method. Nevertheless, it has been found in practice that vibration having both a vertical and a horizontal component may be utilized satisfactorily to achieve a certain correlated ventilation and travel of the bed. Accordingly, the reeds 35 of the apparatus of Figs. 1 to 13 may be diagonally set, and both the vertical and horizontal vibration applied to the retort therethrough as components of a single diagonal reciprocation, utilizing only the vari-speed, vari-stroke, quick return mechanism 46 to supply the motive force.

In connection with the recovery of decomposition products pursuant to the method, it should be noted that the invention contemplates the removal of such decomposition products by gravity while they are in a state heavier than air and susceptible to the influence of gravity.

Whereas this invention is here described and illustrated with respect to certain presently preferred practices and apparatus, it is to be understood that various changes may be made therein and various other adaptations of the invention may be made on the basis of the teachings hereof by those skilled in the art without departing from the scope of the following claims.

I claim:

1. A method of treating a substance for the recovery of decomposition products therefrom, comprising heating the substance substantially in the absence of a combustion-supporting fluid and at a pressure slightly above atmospheric to progressively increasing temperatures which are substantially no greater than will progressively cause liquid decomposition products to form substantially at the substance; providing respective paths of product removal leading from said substance to respective places of recovery; maintaining said paths at respective temperatures above points at which said liquid products will congeal but below points at which they will vaporize; and removing said liquid decomposition products from the residual mass of said substance in their said liquid state, by causing them to travel along said paths, whereby said liquid products will be retained in their said liquid state from the time of formation thereof throughout the recovery thereof, the said procedure from the time of product formation to product recovery being characterized by the substantial absence of thermal condensation.

2. The method recited in claim 1, wherein the said paths are directed downwardly, and the removal of the said liquid decomposition products is accomplished solely by the force of gravity.

3. A method of treating a substance for the recovery of decomposition products therefrom, comprising progressively passing the substance through a heating zone substantially in the absence of a combustion-supporting fluid and at a pressure slightly above atmospheric; applying to said heating zone a predetermined constant supply of heat, whereby the substance progressively absorbs heat and has its temperature progressively increased as it travels; governing the speed of travel of said substance through said heating zone in accordance with the predetermined heat absorptive capacity of said substance necessary to produce a series of liquid decomposition products along the length of said heating zone and substantially at the substance; and separately removing the respective liquid decomposition products from the heating zone in their said liquid form substantially as and when produced, substantially without intermediate thermal condensation or elevation in temperature.

4. The method recited in claim 3, wherein heat is radiated downwardly upon the substance as it passes through the heating zone.

5. A method of treating a substance for the recovery of decomposition products therefrom, comprising progressively passing the substance in the form of massed discrete particles through a heating zone substantially in the absence of a combustion-supporting fluid and at a pressure slightly above atmospheric; applying to said heating zone a predetermined constant supply of heat, whereby the substance progressively absorbs heat and has its temperature progressively increased as it travels; ventilating the mass of discrete particles during the travel thereof; governing the speed of travel of said mass through said heating zone in accordance with the predetermined absorptive capacity of said mass necessary to produce a series of liquid decomposition products along the length of said heating zone and substantially at the substance; and separately removing respective liquid decomposition products from the heating zone in their said liquid form substantially as and when produced, substantially without intermediate thermal condensation or elevation in temperature.

6. The method recited in claim 5, wherein heat is radiated downwardly upon the ventilated mass as it passes through the heating zone.

7. The method recited in claim 5, wherein ventilation of the mass is accomplished by substantially vertical vibration thereof during heat application, and travel of the mass through the heating zone is accomplished by independently applied and independently adjustable substantially horizontal vibration thereof.

8. A method of decomposing a substance and recovering constituent products therefrom, comprising applying only so much heat to the substance substantially in the absence of a combustion-supporting fluid and at a pressure slightly above atmospheric as will produce a desired decomposition product therefrom in a free-falling liquid form substantially at the substance; and flowing said decomposition product in its said liquid form from the zone of heat application by gravity and under conditions substantially preventing thermal condensation or elevation of temperature.

9. The method recited in claim 8, wherein air is excluded from the substance during decomposition thereof by completely enclosing the heat application zone except for an escape opening for the fixed gases generated by the operation.

10. A method of low-temperature carbonization of coals with recovery of by-products, comprising progressively passing a coal, in the form of massed discrete particles, through a heating zone substantially in the absence of a combustion-supporting fluid and at a pressure slightly above atmospheric; maintaining the heating zone at a substantially uniform temperature of not more than approximately 750° centigrade, whereby the coal progressively absorbs heat and has its temperature progressively increased to the maximum as it travels; ventilating the mass of discrete particles during the travel thereof; governing the speed of travel of said mass through said heating zone in accordance with the predetermined heat absorptive capacity of said coal, so that only so much heat is absorbed by the coal as to produce a series of primary decomposition products in liquid form along the length of the heating zone; separately removing the respective decomposition products from the heating zone in their said primary liquid form substantially as and when produced, by gravity flow under conditions substantially preventing thermal condensation or elevation of temperature; and recovering the carbonized char residue of said coal.

11. A method of producing high temperature coke from coals, comprising carrying out the procedure recited in claim 10, as a first stage; extruding the carbonized char residue to form logs, as a second stage; and passing the said logs through a high temperature coking zone, as a third stage.

12. A method of low-temperature carbonization of coals with recovery of by-products, comprising progressively passing coal of a predetermined heat absorptive capacity, in the form of massed discrete particles pre-sized for uniform, rapid heat absorption throughout all cross-sections thereof, through a heating zone substantially in the absence of a combustion-supporting fluid and at a pressure slightly above atmospheric; ventilating the mass of discrete particles during the travel thereof through said heating zone; governing the speed of travel of said mass so as to cause the particles comprising it to absorb, progressively, heat sufficient only to release constituents therefrom in liquid form and to maintain such constituents in liquid condition substantially as formed; and removing said liquid constituents, substantially as formed, approximately at their points of formation.

13. A method of decomposing a substance and recovering constituent products therefrom, comprising heating the substance substantially in the absence of a combustion-supporting fluid and at a pressure slightly above atmospheric to the extent, only, of producing a series of decomposition products in liquid form substantially at the substance; and recovering said decomposition products from said substance solely by gravity separation.

14. A method of decomposing a substance and recovering constituent products therefrom, comprising heating the substance substantially in the absence of a combustion-supporting fluid and at a pressure slightly above atmospheric within a closed chamber to the extent, only, of producing a series of distillation products in primary liquid and heavy vapor states; and selectively recovering the evolved decomposition products solely by gravity separation acting along the length of a gradually, downwardly, sloping conduit.

15. Apparatus for the decomposition of substances and the recovery of decomposition products therefrom, comprising a substantially stationary retort structure defining a heat treatment chamber having a closed, sloping bottom and a top which is open; a cover spaced apart from said open top for closing but not sealing said retort structure, said cover having depending side walls extending below said retort chamber and spaced apart laterally therefrom, and said cover being closed on all sides and the top but open at its bottom; an open container within said chamber for the support of a substance to be treated; means for heating said substance to decomposition temperatures; and a gravity-flow recovery conduit leading downwardly from the low level of the said bottom of the heat treatment chamber.

16. Apparatus as recited in claim 15, wherein the open container for the support of the substance is perforate, and is spaced upwardly from the sloping bottom of the heat treatment chamber.

17. Apparatus as recited in claim 16, wherein means are provided for vibrating the container substantially vertically.

18. Apparatus as recited in claim 17, wherein radiant heating means are disposed above the open container.

19. Apparatus for the decomposition of substances and the recovery of decomposition products therefrom, comprising an elongate retort structure defining an elongate heat treatment chamber having a transversely sloping bottom; an elongate support for material to be treated, said support extending longitudinally of and within said chamber; means for feeding a substance to be treated onto said support at one end of said chamber; heating means extending longitudinally along said chamber; a plurality of gravity-flow recovery conduits, said conduits leading downwardly from the low level of the sloping bottom of said chamber and being disposed successively along the length of said retort structure; means for moving the supported material longitudinally along said chamber from the said one end thereof; and an elongate hood, open at its bottom but otherwise closed, covering the retort structure down to a level below the said support, said hood having depending side walls spaced apart laterally from said support for closing but not sealing said heat treatment chamber.

20. Apparatus as recited in claim 19, wherein the retort structure comprises a base assembly and an independently supported cover therefore; wherein the trough is supported by said base assembly; wherein means are provided for vibrating said base assembly and trough substantially vertically along its length; and wherein independently adjustable means are provided for vibrating said base assembly and trough substantially horizontally, longitudinally thereof.

21. Apparatus for the decomposition of substances and the recovery of decomposition products therefrom, comprising an elongate retort structure made up of a base assembly and an independently supported cover for said base assembly, said retort structure defining an elongate heat treatment chamber having a transversely sloping bottom; an elongate trough supported by said base assembly and extending longitudinally of and within said chamber; heating means extending longitudinally along said chamber; a plurality of gravity-flow recovery conduits leading downwardly from the low level of said sloping bottom and disposed successively along the length of the retort structure; means for vibrating the base assembly and trough substantially vertically; independently adjustable means for vibrating the base assembly and trough substantially horizontally, longitudinally thereof; vibratory reed means connecting said vertical vibrating means and said horizontal vibrating means to the base assembly in common, said reed means comprising respective pairs of rigid frame structures secured back-to-back, and a flexible reed element interposed between said frame structures, said vertical vibrating means being connected directly to the flexible reed element, and said horizontal vibrating means being connected to one of said frame structures; and means for feeding a substance to be treated into said trough at one end thereof.

22. Apparatus as recited in claim 21, wherein the base assembly is made up of lightweight, structural, insulation material in slab form resting upon and secured to an elongate metal supporting member, and wherein the trough is supported upon said insulation material by metal supporting members secured to said insulation without contacting said elongate metal supporting member.

23. Apparatus as recited in claim 22, wherein the trough is perforate along its length.

24. Apparatus as recited in claim 23, wherein the base assembly is divided into a plurality of elongate sections arranged end-to-end in overlapping relationship, and wherein each of said sections is provided with independently adjustable vibrating means.

References Cited in the file of this patent

UNITED STATES PATENTS

| Number | Name | Date |
|---|---|---|
| 860,058 | Post | July 16, 1907 |
| 1,415,202 | Smith | May 9, 1922 |
| 1,622,722 | Jakowsky | Mar. 29, 1927 |
| 1,793,838 | Carr et al. | Feb. 24, 1931 |
| 1,814,463 | Trent | July 14, 1931 |
| 1,906,755 | Karrick | May 2, 1933 |
| 2,091,702 | Daniels | Aug. 31, 1937 |
| 2,110,373 | Van Ackeren | Mar. 8, 1938 |
| 2,282,654 | Horner | May 12, 1942 |
| 2,349,387 | Storrs | May 23, 1944 |
| 2,434,815 | Shaw | Jan. 20, 1948 |
| 2,441,386 | Berg | May 11, 1948 |
| 2,466,593 | Jones | Apr. 5, 1949 |
| 2,501,153 | Berg | Mar. 21, 1950 |
| 2,525,051 | Storrs | Oct. 10, 1950 |
| 2,536,098 | Royster | Jan. 2, 1951 |

OTHER REFERENCES

Lowry: "Chemistry of Coal Utilization," Wiley & Sons (1945), chapter 20, pages 761 to 773.